US012562809B2

(12) United States Patent
Pascente et al.

(10) Patent No.: US 12,562,809 B2
(45) Date of Patent: Feb. 24, 2026

(54) PREDICTION AND AVOIDANCE OF RADIO FREQUENCY INTERFERENCE

(71) Applicant: RAYTHEON COMPANY, Waltham, MA (US)

(72) Inventors: Vincent A. Pascente, Aurora, CO (US); Varian S. Little, Aurora, CO (US); Jared B. Dorny, Waltham, MA (US)

(73) Assignee: Raytheon Company, Arlington, VA (US)

( * ) Notice: Subject to any disclaimer, the term of this patent is extended or adjusted under 35 U.S.C. 154(b) by 358 days.

(21) Appl. No.: 18/138,691

(22) Filed: Apr. 24, 2023

(65) Prior Publication Data

US 2024/0356631 A1 Oct. 24, 2024

(51) Int. Cl.
*H04B 7/185* (2006.01)

(52) U.S. Cl.
CPC ..... *H04B 7/18519* (2013.01); *H04B 7/18513* (2013.01)

(58) Field of Classification Search
CPC ........................ H04B 7/18519; H04B 7/18513
See application file for complete search history.

(56) References Cited

U.S. PATENT DOCUMENTS

| | | | |
|---|---|---|---|
| 5,926,758 A | 7/1999 | Grybos et al. | |
| 9,185,516 B2 | 11/2015 | Fischer et al. | |
| 9,363,642 B2 | 6/2016 | Fischer et al. | |
| 10,277,309 B2 | 4/2019 | Kanner et al. | |
| 10,314,039 B2 | 6/2019 | Stephenne et al. | |
| 2004/0110467 A1* | 6/2004 | Wang ..................... | H04B 7/195 455/12.1 |
| 2017/0146664 A1 | 5/2017 | Kanner et al. | |

OTHER PUBLICATIONS

International Search Report and Written Opinion of the International Searching Authority dated Jun. 13, 2024 in connection with International Patent Application No. PCT/US2024/019202, 10 pages.

* cited by examiner

*Primary Examiner* — Ayodeji O Ayotunde

(57) ABSTRACT

System and method for prediction and avoidance of RF interference for a satellite from one or more of resident space objects (RSOs) includes: obtaining orbit data and transmission data for the satellite and the plurality of RSOs; calculating a visibility window; performing comparison of transmission parameters; calculating an orientation of each of the RSOs; when there is a match of transmission parameters and the orientation is within a predetermined threshold, adding the compatible RSO to a compatible RSO list; generating a course of action (COA); scoring each of the compatible RSO; selecting a best scored COA; scheduling the first course of action; and autonomously executing the first course of action by the satellite to avoid RFI.

20 Claims, 6 Drawing Sheets

402 — RFI AND ORBIT DATA

404 — IDENTIFY COMPATIBLE COAs

406 — CALCULATE COMPATIBILITY SCORE FOR EACH AVAILABLE COA

408 — SELECT A COA BASED ON PREDETERMINED WEIGHTING

410 — CUSTOMIZE WITH ACTUAL DATA AS NEEDED (FREQUENCY, TIME, POWER, ETC)

END

602 — OBTAIN ORBIT AND TRANSMISSION DATA

604 — CALCULATE A VISIBILITY WINDOW

606 — PERFORM COMPARISON

608 — CALCULATE ORIENTATION

610 — ADD COMPATIBLE RSO TO LIST

612 — GENERATE A COA

614 — SCORE EACH COMPATIBLE RSO IN THE LIST

616 — SELECT A HIGHEST SCORED COA

618 — SCHEDULE THE HIGHEST SCORED COA

620 — AUTONOMOUSLY EXECUTE

PREDICTION AND AVOIDANCE OF RADIO FREQUENCY INTERFERENCE

FIELD

The present disclosure generally relates to electronic circuits and more particularly to RF interference prediction and avoidance.

BACKGROUND

Satellites are used for many military and civilian purposes, such as for navigation, reconnaissance, relaying of communications, tracking the weather, and the like. A satellite typically carries radio equipment for connecting to a ground station and other satellites. The ground station may be positioned between the satellite and one or more operator terminals, and may be configured to relay data between the satellite and the operator terminals.

In an increasingly crowded and complex space environment, a spacecraft (e.g., a satellite) requires the ability to autonomously plan and avoid Radio Frequency (RF)/Electromagnetic Interference events in real time.

Currently, Radio Frequency Interference (RFI), or Electromagnetic Interference (EMI) events are planned for in advance and generally based on past detection and classification. Typically, spacecrafts can only react to pre-planned, known events that have been uploaded. Moreover, conventional spacecraft systems do not perform autonomous avoidance planning.

SUMMARY

In some embodiments, the disclosure is directed to a circuit and a method for RF interference prediction (detection) and avoidance.

In some embodiments, the disclosure is directed to a method for prediction and avoidance of RF interference or Electromagnetic Interference (RFI) for a high value asset (HVA) from one or more of a plurality of resident space objects (RSOs). The method includes: obtaining orbit data and transmission data for the HVA and the plurality of RSOs; calculating a visibility window of time for each of the RSOs being separated from the HVA by less than a predetermined threshold distance; performing comparison of transmission parameters of each of the RSOs and the HVA to determine whether each of the RSOs is having a potential RFI with the HVA; calculating an orientation of each of the RSOs in a respective visibility window of time to determine the direction of transmission of each of the RSOs with respect to the HVA; when there is a match in comparison of transmission parameters and the orientation of a compatible RSO in the visibility window of time is within a predetermined threshold, adding the compatible RSO to a compatible RSO list; generating a course of action (COA) based on the compatible RSO list; scoring each of the compatible RSO in the compatible RSO list; selecting a best scored COA for a first course of action for avoidance of RFI; scheduling the first course of action; and autonomously executing the first course of action by the HVA to avoid RFI.

In some embodiments, the disclosure is directed to a satellite capable of predicting and avoiding RFI from one or more of a plurality of resident space objects (RSOs). The satellite includes: a processing circuit configured to: obtain orbit data and transmission data for the HVA and the plurality of RSOs; calculate a visibility window of time for each of the RSOs being separated from the HVA by less than a predetermined threshold distance; perform comparison of transmission parameters of each of the RSOs and the HVA to determine whether each of the RSOs is having a potential RFI with the HVA; calculate an orientation of each of the RSOs in a respective visibility window of time to determine the direction of transmission of each of the RSOs with respect to the HVA; when there is a match in comparison of transmission parameters and the orientation of a compatible RSO in the visibility window of time is within a predetermined threshold, add the compatible RSO to a compatible RSO list; generate a course of action (COA) based on the compatible RSO list; score each of the compatible RSO in the compatible RSO list; select a best scored COA for a first course of action for avoidance of RFI; schedule the first course of action; and autonomously execute the first course of action by the HVA to avoid RFI.

In some embodiments, the transmission parameters include one or more of frequency, volume of influence, power, gain and modulation. In some embodiments, the COA actions include one or more of hand off to a different HVA, creation of an outage window with no transmission, switching frequencies, adjusting power or adjusting modulation, using a different communication window and shortening a communication window time. In some embodiments, the COA scoring is based on normalizing and weighing one or more factors, including range, link margin power, antenna size and receiver sensitivity.

BRIEF DESCRIPTION OF THE DRAWINGS

The components in the figures are not necessarily to scale, emphasis instead being placed upon illustrating the principles of the disclosure. Like reference numerals designate corresponding parts throughout the different views. Embodiments are illustrated by way of example and not limitation in the figures of the accompanying drawings, in which.

DETAIL DESCRIPTION

Figure 1:
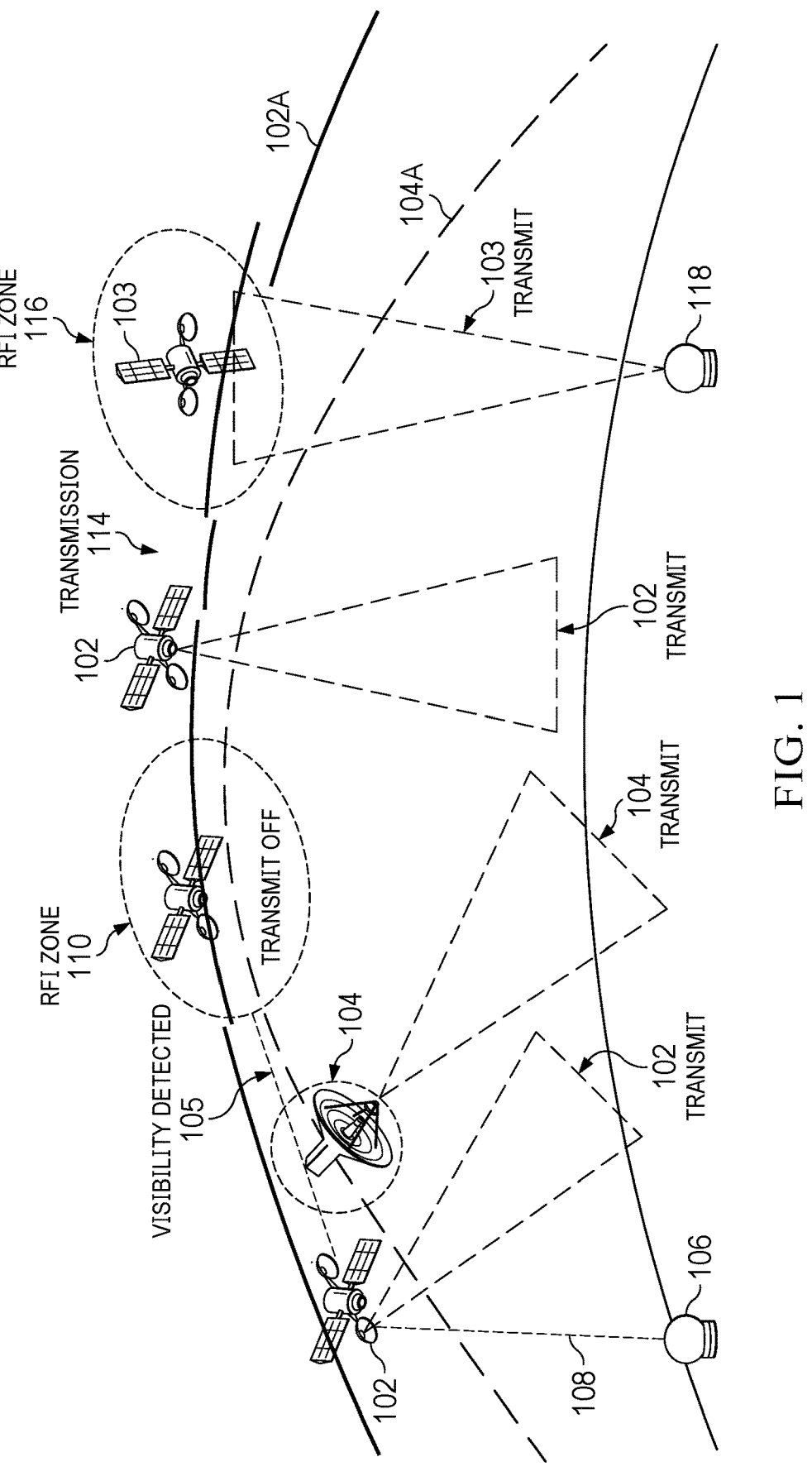
FIG. 1 depicts an environment for RF interference prediction and avoidance, according to some embodiments of the disclosure.

In some embodiments, the present disclosure is directed to prediction and avoidance of RF interference or Electromagnetic Interference (EMI) events by using existing space catalog data, and visibility generation and knowledge of transmission parameters (e.g., frequencies, power, modulation, etc.) to plan RFI/EMI avoidance directly on a spacecraft. Hereinafter, the term RFI refers to RF interference and/or Electromagnetic Interference, which are treated similarly by the present disclosure. Avoidance has several different flavors: attitude slews, hand off and cease broadcasting/listening, frequency hop, etc., as described in more detail below.

The process for 'on-the-fly' RFI prediction and autonomous RFI avoidance on board a spacecraft predicts upcoming RFI and autonomous avoidance, and expanded into other domains, such as cell carriers. In some embodiments, the process comprises utilizing a space catalog of resident space objects (RSOs), and optionally ground transmitters, with their RF capabilities (frequencies/power/volume of influence/beam pattern). The catalog is periodically updated, and a high value asset (HVA) automatically performs visibility generation (or line of sight analysis) on the RSOs and autonomously selects an appropriate course of action (COA) to avoid the RFI.

In some embodiments, the system and method of the present disclosure maintain uninterrupted signals for aircrafts, standard users, and avoid interrupting communications from established satellites in similar, or higher, orbit regimes. The system and method of the present disclosure are capable of predicting and avoiding interference volumes, which have become increasingly important in real time. Spacecrafts (e.g., satellites) with these capabilities are able to analyze potential interference (such as jamming, or other threats due to close proximity), and plan avoidances in advance by, for example, attitude slews, hand off and cease broadcasting/listening, frequency hop, etc. The interference(s) may be from a ground station transmitting, from a spacecraft in a higher orbit, transmitting to the ground, and/or from another satellite transmitting space to space signals.

Taking the operator out of the loop and placing the processing on the spacecraft in orbit eliminates the delay in decision making and upload time and thus allowing the spacecraft to better react in a timely manner. In addition, reducing the cognitive load on satellite operators for all orbit regimes increases mission success.

FIG. 1 depicts an environment for RFI prediction and avoidance, according to some embodiments of the disclosure. As shown, a high value asset (HVA) 102, such as a satellite, is in the space on a travel path 102A, while communicating with another HVA 103. A resident space object (RSO) 104, such as another satellite or a space station, and ground stations 106 and 118 are also communicating with other sources, using RF or EM signals, and therefore may be producing signal interference when HVA 102 is in their proximity. This RFI may affect the communication between the HVA 102 and HVA 103.

As shown, ground station 106 transmits an updated space catalog 108 to the HVA and keeps updating the catalog, when needed. The HVAs receive and process the space catalog, which is a list or tabulation of RSOs, typically grouped together because they share a common type, morphology, origin, means of detection, or method of discovery. These catalogs are currently compiled by computers from an automated survey, published and made available as computer files.

HVA 102 calculates and detects visibilities and potential RFIs from other RSOs (for example, RSO 104 travelling in path 104A) at 105 that could affect the quality of is communication with HVA 103, based on the information in the received catalog and selects its course of action by producing schedule for avoidance and reengagement. For example, HVA 102 detects a potential RFI event with the RSO 104 and yields an RFI zone 110 when the HVA and the RSO are within a certain distance and visibility time windows. For instance, HVA 102 may stop transmission, change frequency, power or modulation, when it determines that the transmission may be impacted by nearby RFI. The HVA 102 turns off its transmission in the RFI zone 110, and then turns it transmission back on when it exists the RFI zone at 114. Similarly, HVA 103 may also predict another RFI zone 116 with another RSO, a ground transmitter 118 or RSO 104 when RSO 104 is in its visibility window, while HVA 103 is communicating with HVA 102 or other sources. HVA 103 also similarly avoids an interference in this RFI zone 116.

In these cases, HVAs 102 and 103 may also plan resource handoff for outages. In some embodiments, hand-off, or store and forward, involves sending relevant information to another satellite in the constellation so that they can perform the required actions until HVAs 102 and 103 are back in service (if possible). HVAs 102 and 103 may then produce status updates to mission control, for example, ground station 106 or 118, and execute planned schedule, considering ground Interferences as well as RSO 104 and ground 118 interferences, respectively. In some embodiments, a nominal planned schedule includes sensor collection and processing, station keeping, health status, etc., where an RFI COA would be inserted into that schedule plan as needed.

FIG. 2 shows an exemplary system for an RFI prediction and autonomous avoidance, according to some embodiments of the disclosure. As depicted, the orbit data 202 (e.g., one or more catalogs) and transmission data 204 (RF capabilities, for example, frequency/power/volume of influence/beam pattern, and the like of RSOs (and optionally of the HVA 206) are received (from ground or other RSOs), (e.g., by a HVA 206). An RF prediction engine 208, as part of the HVA, then predicts any RFI by any of the RSO1 to RSOn. The prediction engine 208 performs a visibility generation for each RSO1-*n* by using the orbit data 202. The visibility generation determines the angle or orbital path of each RSO and calculates a period (window) of time that each RSO is separated by less than a predetermined threshold distance from the HVA 206, as "upcoming visibility windows" 1-*n*. In some embodiments, the visibility generation entails running a known visibility generation algorithm to perform a distance assessment, which then directly translates into a RF power model. Power models are based on a link budget analysis that take into account assumed power at the source and receiver as well as distance. If the link budget does not close, communication cannot happen, therefore no RFI.

In some embodiments, the visibility is determined based on line-of-sight and radiation pattern of each of the RSOs. The visibility is determined to correspond to a distance between a respective RSO required to achieve an acceptable signal as received by the HVA 206. For instance, the visibility may be calculated responsive to a directivity of the HVA radiation pattern, power level of the radiation pattern, and/or other known parameters.

When visibilities are detected, the prediction engine 208 checks to see whether there is a need to add any constrains, such as sun and/or moon angles and other mission-dependent constraint. RF analysis is also performed by the prediction engine 208. The prediction engine 208 uses the transmission data 204 for each RSO and compare it with transmission data of the HVA 206. For example, frequency, volume and/or power of each RSO is compared with those of the HVA to calculate frequencies or frequency ranges at which the RSOs operate and is utilized to determine RSO within a distance range of the HVA 206 that operate at overlapping frequencies (e.g., within a threshold range) with the HVA.

Since the RSOs and HVAs are moving, their orientations are dynamically changing. This change in orientation affects the RFI from each RSO over time and therefore needs to be accounted for in RFI determination of each RSO. At 210, the orientation of each of each RSO in the time window that a respective RSO is within a threshold distance from the HVA 206, and the orientation of the HVA is calculated, as explained in more detail below. The orientation determination yields the relevant RSOs, the transmission of which is directed towards the HVA 206. If there are matching frequencies, and the volume, power and orientation potentially cause an RFI event, the RSO and visibility times are added to a list 212. An RFI event is determined for a period of time when HVA and an RSO are within the visibility window, as predicted by the orbital models based on the orbit data 202 and the transmission data 204. In some embodiments, the list may include RFI events, RSO avoidance list and avoidance windows.

If the list 212 is non-empty, HVA 206 generates course of action (COA) options 214. In some embodiments, the COA actions may include hand off to a different HVA (without any RFI), creation of an outage window with no transmission, switch frequencies, power, and/or modulation, use a different communication window, shorten the communication window time, and the like.

In some embodiments, HVA utilizes a course of action (COA) scoring process 216 to generate and select the best scored COA for the best course of action for avoidance. The HVA adds the selected COA to its on-board schedule system, autonomously executes the selected COA 218 on the scheduled time and optionally, notifies the ground or a central control system at 220. Once the RFI event is past, HVA returns to normal operation at 222.

In some embodiments, the COA scoring is based on normalizing and weighing one or more factors, such as range, link margin, power, antenna size, receiver sensitivity that are provided in each of the COAs. Other factors may be added (eventual configuration) which would adjust the scoring formula to account for those factors as well. In some embodiments, the score/rank of a COA is based on a defined, and configurable, set of comparators that a control station needs to perform a mission for a specified HVA. Reducing this selection time and lowering the error rate, while providing an adaptable RF and/or EM agnostic system is critical to mission success.

In some embodiments, the COA scoring accepts RF inputs (RX) for monitoring, transmitting(TX) and considers (both RX & TX) scenarios. Computation of the scoring may include generation of visibility opportunities between specified HVAs and RSOs and configured resources, azimuth/elevation/range generation, link budget analysis (for multiple antenna/aperture types and different signal processors, calculated power received by other RSOs and *obscura* crossing times. In some embodiments, workflow identifiers and guidance parameters may also be considered. The results of calculations are available to the scoring process where the process uses range and power for determining the most feasible options. These options are evaluated to select which COA will be used and which resource will be scheduled for its autonomous execution.

Some embodiments of the present disclosure may be implemented in the form of processes and circuits for practicing those processes. Some embodiments of the present disclosure may also be implemented in the form of program code embodied in tangible media, such as magnetic recording media, optical recording media, memory devices, hard drives, or any other machine-readable storage medium.

Figure 3:
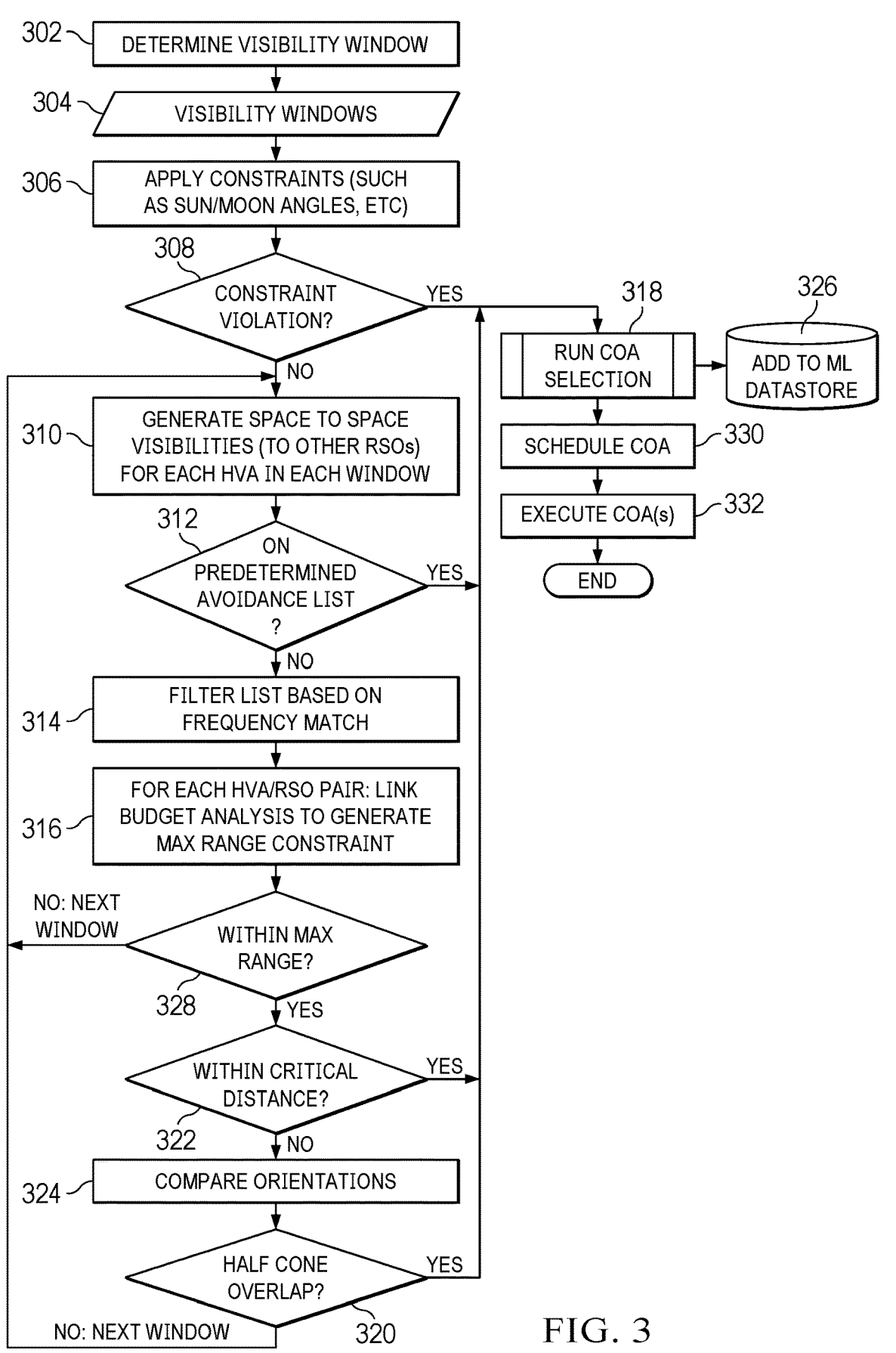
FIG. 3 shows an exemplary process for an RFI prediction and autonomous avoidance, according to some embodiments of the disclosure.

FIG. 3 shows an exemplary process for an RFI prediction and autonomous avoidance, according to some embodiments of the disclosure. In some embodiments, the process may be started by data upload or by an artificial intelligence (AI)/Machine leaning (ML) engine/model/process. In some embodiments, the process is started every orbit revolution (assuming it hasn't gotten any new data since the start of the last revolution). As shown in block 302, visibility windows 304 are determined for one or more HVA and one or more RSOs. Complexity arises when comparing the positions and orientations of a pair of HVA/RSO during a window. RFI from the RSO could be intermittent depending on orbit and orientation compared to both HVA and RSO. As space vehicles move through their orbit, they slew their attitude to maintain contact which changes the RF cone angle. Either HVA or RSO could have an RFI event that disrupts the communication. For example, a first RSO could interfere with a first HVA at the beginning of a window and later could interfere with a second RSO at the end of the window. Also, the sun, moon or weather could be interfering with one but not the other.

Figure 2:
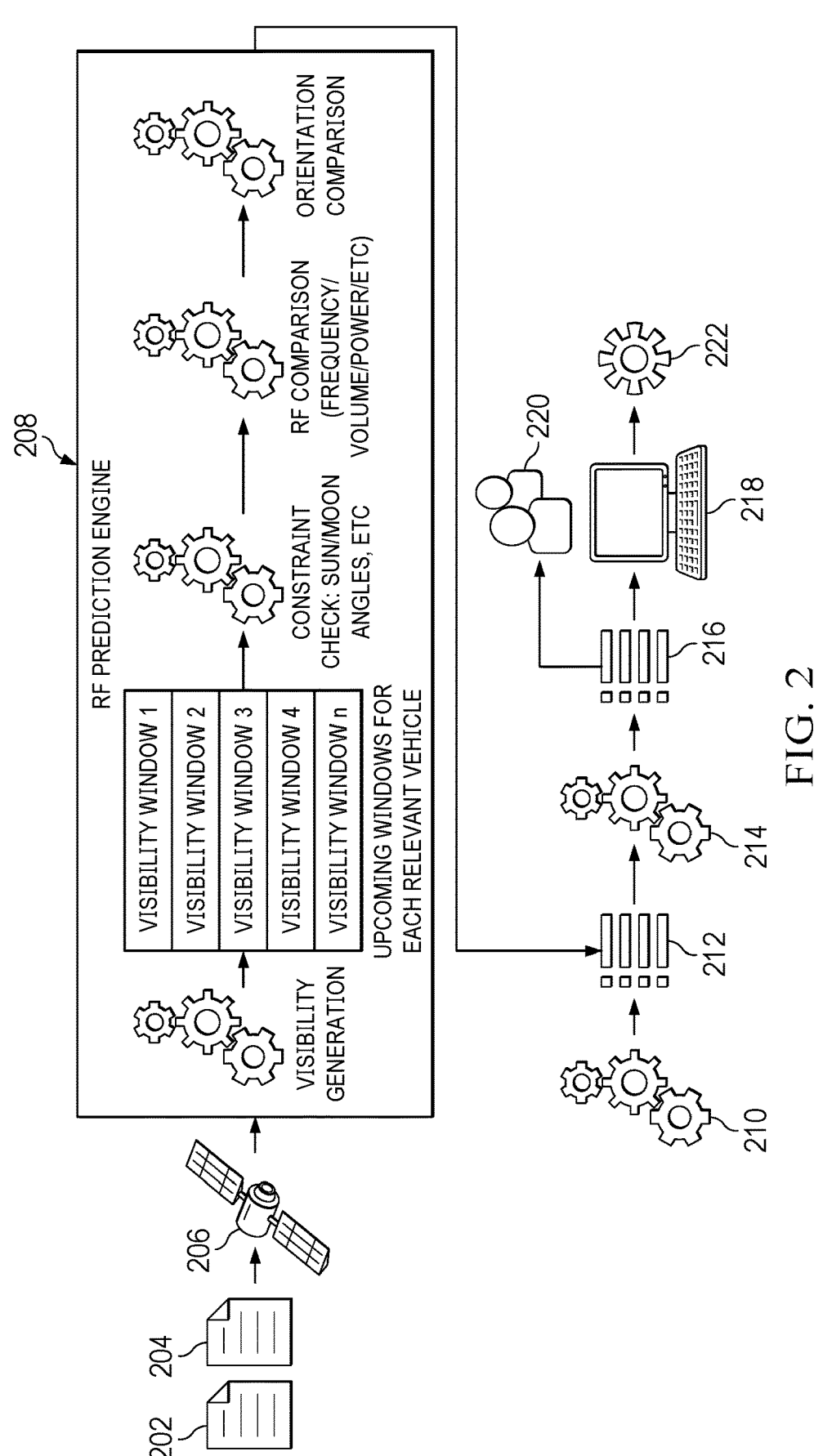
FIG. 2 shows an exemplary system for an RFI prediction and autonomous avoidance, according to some embodiments of the disclosure.

In block 306, constraints such as sun, moon, angles of the sun or moon to the HVA are factored in (applied) during a visibility window to predict an RFI event. Block 308 checks for any violation of the constraints. When there is no violation, space to space visibilities (to other RSOs) is generated for each HVA in each window, in block 310. This considers a respective pair of vehicles' visibility by each vehicle in the pair, during a visibility window. In block 312, it is determined whether the RSO is on a predetermined avoidance list, for example, whether there are known offender. If so, always assume RFI and avoid them. If not on predetermined avoidance list, in block 314 the list of visibility windows and RSOs is filtered based on frequency match, as describe above with respect to FIG. 2. In block 316, for each HVA/RSO pair, link budget analysis is performed to generate max range constraint. Link budget analysis considers bandwidth, power, gain, distance etc. to generate max range constraint. If the link budget doesn't close, that is, there is not sufficient power, there is no RFI. In block 328, if the max range constraint is not within a maximum rage (generated based on assumed power of RSO and known power of HVA, as well as frequency, gain, etc.), the process goes back to block 310 and picks other visibility window.

When the HVA is within the max range constraint, and within a predetermined critical distance (block 322), a (optionally, scored) COA is selected in block 318, scheduled for execution in block 330 and executed in block 332. Critical distance refers to a distance where orientation doesn't matter, for example, if the power of RSO is sufficiently high and the HVA is close to the RSO, it won't matter where they are pointing to and there will be RFI. This is based on Power of the transmitting RSO only and a distance to power ratio. Optionally, in block 326, the executed COA is added to an AI/ML dataset.

When HVA is within the max range constraint, but not within the predetermined critical distance (block 322), orientation angles of the HVA and the RSO are compared, in block 324. In some embodiments, orientation angles are compared, based on known information of RSO and how they are pointing, such as across orbit communication, nadir pointing for ground communicating, direction of directional antenna etc. When the orientation angles are within half cone overlap (block 320), the process goes to block 318 and continues from there as describe above. However, when the orientation angles are not within half cone overlap (block 320), the goes back to block 310 and picks other visibility window. That is, when the vehicles are close enough, orientation is not a significant factor.

Figure 5:
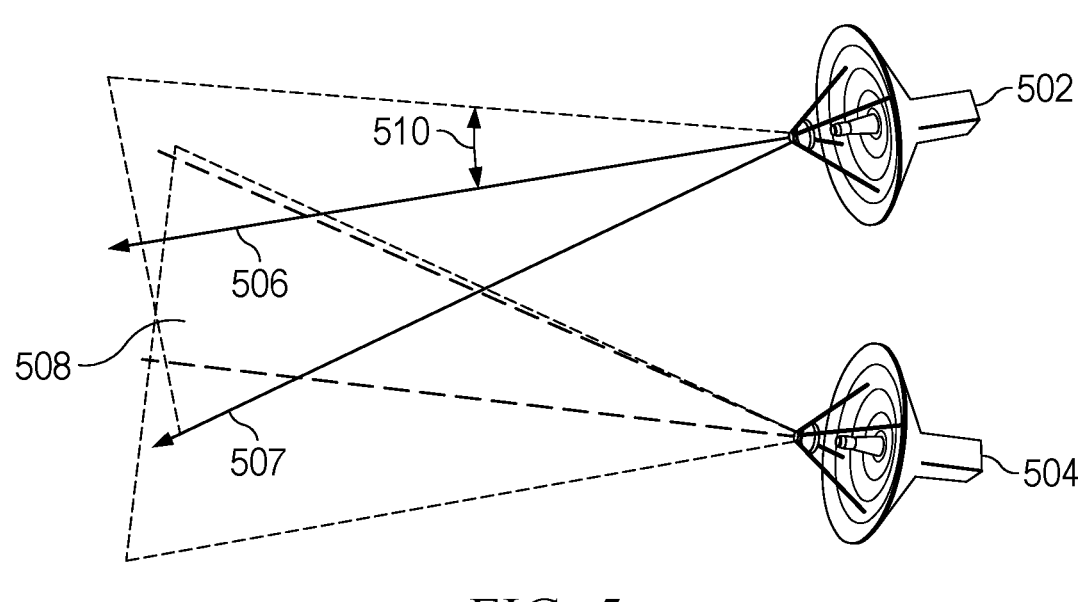
FIG. 5 shows an exemplary half cone overlap of two transmitting antennas, according to some embodiments of the disclosure.

FIG. 5 shows an exemplary half cone overlap of two transmitting antennas, according to some embodiments of the disclosure. Assuming that a directional antenna 502 RF emission roughly in the shape of a cone, the direction of that cone can be defined via vector 506 in the center of the cone. The edge of the cone can also be defined with a vector 507 some angle 510 away from the center vector (rotated around to create the cone). The half angle 510 of the cone is the angle from the center vector 506 to the edge vector 507 (or the Arccosine of the Dot product of those two vectors). If the half cone angle of antenna 502 overlaps the half cone of another antenna 504, there is potential for RFI at the overlap region 508.

Referring back to block 308, when there is no violation of the constraints, the process goes to block 318 and continues from there as describe above. In some embodiments, the constraints may include the sun and/or moon angles and mission dependent constraints.

In some embodiments, the unique combination of visibility generation, and orientation analysis with RF comparison analysis produces a list of RFI events that indicate potential problems to avoid, and autonomous selection and execution of a list of course of actions (COAs) enables the HVA to be proactive (autonomous) instead of reactive (based on prior knowledge) in avoiding RFI/EMI situations. In some embodiments, the autonomously selecting and executing a course of action is based a deterministic scoring algorithm. The process is flexible and modifiable such that new data can alter prediction of future events.

In some embodiments, the process or portions thereof may be executed by AI/ML engine to determine link budget type of assessment. Different ML models that consider power, frequency, bandwidth, and whether orientation is applicable are provided. ML would be driven by actual executed COAs, what RSOs they were against, frequency/power/gain, time window and orientation. Over time, patterns can emerge that the AI engine can feed into a "Consider" list for a particular calculation. In other words, AI/ML engine takes execution data as input and develops patterns. In some embodiments, HVA execution data is provided by the ground station after analysis of the COA and RFI event to generate better predictions models. In some embodiments, if there are sufficient patterns that have emerged for a potential RFI event, the AI/ML engine starts the process at any time when there is sufficient reason based on those patterns at block 302 with the current data set.

Figure 4:
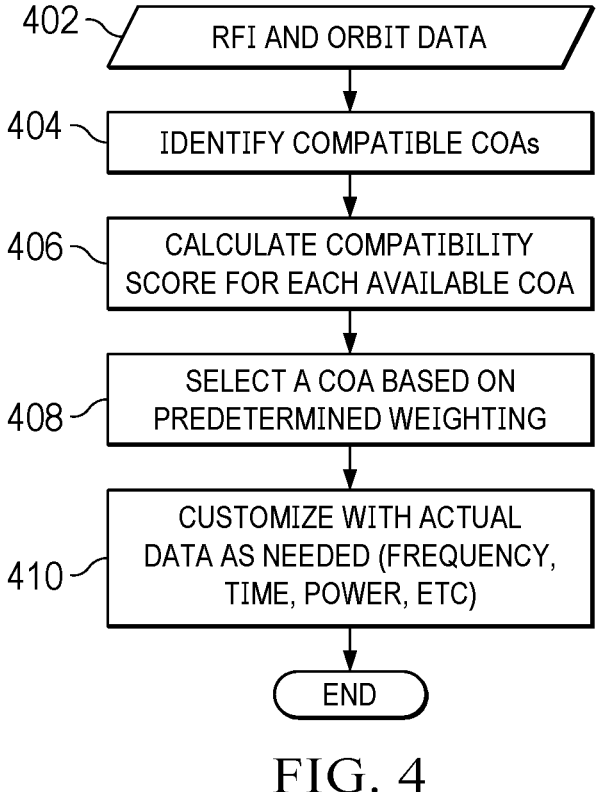
FIG. 4 illustrates an exemplary process for autonomous course of action selection, according to some embodiments of the disclosure.

FIG. 4 illustrates an exemplary process for autonomous course of action selection, according to some embodiments of the disclosure. As shown in block 402, RFI and orbital data is received by an HVA. The data may include one or more of RFI windows, the HVA entire communication window, available frequencies for the HVA, RFI frequency, RFI power, maximum power of the HVA, maximum power of the interfering signal (RSO), other window options and criticality. Other window option may include another time in the orbit when the HVA could accomplish its mission. That is, rather than trying to force something in the current window, the HVA could just wait and then transmit. In some embodiments, when the HVA window is large enough and the RFI window short enough, the HVA utilizes a portion of its window (before or after the RFI) for the mission).

In some embodiments, criticality refers to criticality of the mission and/or the RSO action that is going to have RFI with the HVA, which is mission dependent and action dependent. For example, a health check can be considered low priority, so the HVA may choose to stop transmitting. Whereas, communications relay could be much more critical, so the HVA may consider other options rather than just turning off.

In block 404, compatible COA are identified, based on some rule set executed by a rule engine. For example, if the HVA has more power available than the RSO, adding power is a potential COA. Other examples of compatible COA include switching frequency or frequency band, hand off to another HVA, increase transmission power, use a different crosslink use a different communication window, shorten the communication window time, and adjust modulation. Cross links are sometimes used in a mesh network, where one satellite can be talking to several other satellites. This means different antennas may be positioned on different points of the satellite body. Therefore, the HVA could use a different link (antenna) to communicate with other HVAs In block 406, a compatibility score is calculated for each compatible COA in block 404 above based on a predetermined weighing algorithm. Compatibility scores/formulas will differ based on the COA type, as well as mission type. Possible examples include:

Increase power Compatibility Score=$A$(100normalized(minimumRangeToHVA2))+$B$(100-normalized(minimumRangeToRSO))+$C$(100-normalized(minimumReceivePower)+$D$(100-normalized(minimumTransmitPower)+$E$(100-normalized(hvaMaxTrasmitPower−rsoMaxTransmitPower)+ . . . +$N$, orr Frequency switch Compatibility Score=$X$(100-normalized (data/dataRate))+$Y$(100-normalized(length-OfWindow))+ . . . +$N$, where $A$, $B$, $C$, $D$, $E$ and $X/Y$ are different weights depending on the mission, hardware, etc.

In block 408, a compatible COA is selected responsive to weighted compatible COAs. This may be based on mission, mission impact, timeliness, an a priori commander's intent, etc. For example, a power increase may impact the overall mission, or data may not be able to be delivered in a timely fashion if a different frequency is used at a slower data rate. However, If COAs such as frequency switching, or modulation adjustment are selected, the process flow needs to be re-executed to verify that a different RFI event is not predicted for the new parameters. In block 410, the selected COA is customized with relevant data such as frequency, time, power and the like and then autonomously executed.

Figure 6:
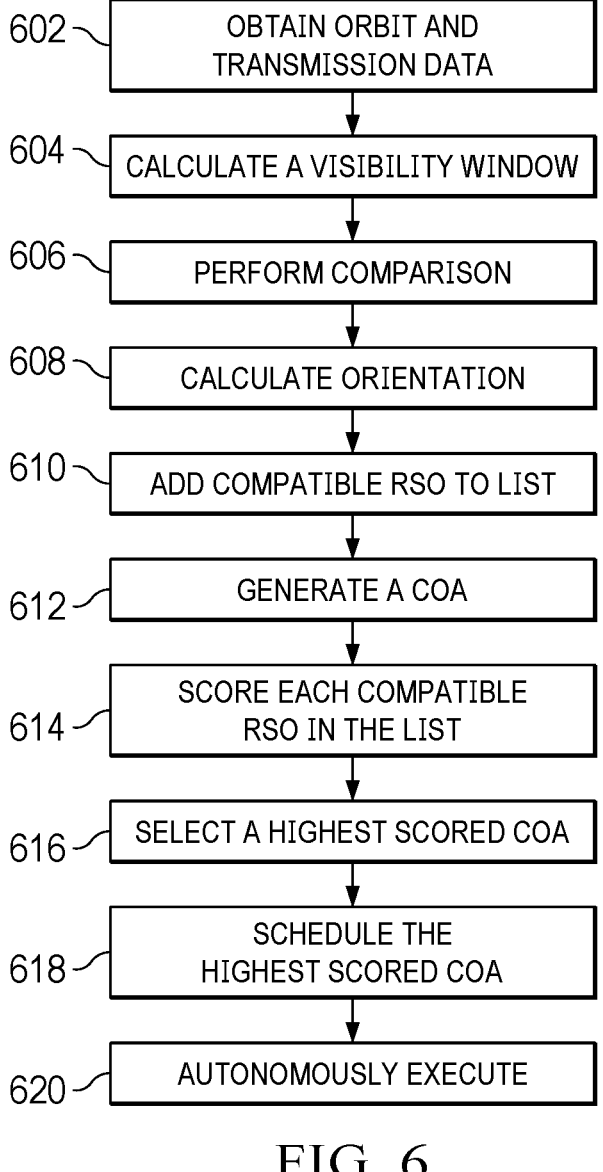
FIG. 6 depicts an exemplary process flow for an RFI prediction and autonomous avoidance, according to some embodiments of the disclosure.

FIG. 6 depicts an exemplary process flow for an RFI prediction and autonomous avoidance, according to some embodiments of the disclosure. As shown, a method for prediction and avoidance of RFI for an HVA from one or more of a plurality of RSOs includes obtaining orbit data and transmission data for the HVA and the plurality of RSOs, in block 602. A visibility window of time is calculated for each of the RSOs being separated from the HVA by less than a predetermined threshold distance, in block 604. The visibility window determines an angle or orbital path of each RSO and represent a period of time that each RSO is separated by less than a predetermined threshold distance from the HVA.

In block 606, the transmission parameters of each of the RSOs is compared to those of the HVA to determine whether each of the RSOs is having a potential RFI with the HVA while communicating with other sources (HVAs) and an orientation of each of the RSOs in a respective visibility window of time is calculated to determine the direction of transmission of each of the RSOs with respect to the HVA, in block 608. When there is a match in comparison of transmission parameters and the orientation of a compatible RSO in the visibility window of time is within a predetermined threshold, the compatible RSO is added to a compatible RSO list, in block 610. In block 612, a course of action (COA) is generated based on the compatible RSO list. The COA actions may include one or more of hand off to a different HVA, creation of an outage window with no transmission, switching frequencies, power or modulation, using a different communication window and shortening a communication window time.

In block 614, each of the compatible RSO in the compatible RSO list is scored. In some embodiments, the COA scoring is based on normalizing and weighing one or more factors, including range, link margin power, antenna size and receiver sensitivity. In block 616, the best scored (e.g., highest scored or lowest scored) COA is selected for a first course of action for avoidance of RFI in block 618, and the first course of action is scheduled for execution, in block 620. In some embodiments, the best score is mission dependent. HVA then autonomously executes the first course of action to avoid RFI, in block 620.

One skilled in the art would recognize that the processes of the present disclosure may be executed by one or more processing circuits. The term "processing circuit" is used herein to mean any combination of hardware, firmware, and software, employed to process data or digital signals. Processing circuit hardware (processor) may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, memory, input/output circuit, an FPGA and a CPU, interconnected on a PCB.

It will be recognized by those skilled in the art that various modifications may be made to the illustrated and other embodiments of the disclosure described above, without departing from the broad inventive scope thereof. It will be understood therefore that the disclosure is not limited to the particular embodiments or arrangements disclosed, but is rather intended to cover any changes, adaptations or modifications which are within the scope and spirit of the disclosure as defined by the appended claims and drawings.

The invention claimed is:

1. A method performed by a high value asset (HVA) in orbit for prediction and avoidance of Radio Frequency (RF) Interference (RFI) or Electromagnetic Interference (EMI) from one or more of a plurality of resident space objects (RSOs), the method comprising:
obtaining orbit data and transmission data for the HVA and the plurality of RSOs;
calculating a visibility window of time for each of the RSOs being separated from the HVA by less than a predetermined threshold distance;
performing comparison of transmission parameters of each of the RSOs and the HVA to determine whether each of the RSOs has a potential RFI or EMI with the HVA;
calculating an orientation of each of the RSOs in a respective visibility window of time to determine a direction of transmission of each of the RSOs with respect to the HVA;

10 when there is a match in comparison of the transmission parameters and the orientation of a compatible RSO in the visibility window of time is within a predetermined threshold, adding the compatible RSO to a compatible RSO list;
generating courses of action (COAs) based on the compatible RSO list;
scoring each of the COAs;
selecting a best scored COA for a first course of action for avoidance of RFI or EMI;
scheduling the first course of action; and
autonomously executing the first course of action by the HVA to avoid RFI or EMI.

2. The method of claim 1, wherein the transmission parameters include one or more of: frequency, volume of influence, power, gain, and modulation.

3. The method of claim 1, wherein the COAs include one or more of: hand off to a different HVA, creation of an outage window with no transmission, switching frequencies, adjusting power or adjusting modulation, using a different communication window, and shortening a communication window time.

4. The method of claim 1, wherein scoring each of the COAs is based on normalizing and weighing one or more factors, including range, link margin power, antenna size, and receiver sensitivity.

5. The method of claim 1, wherein a score of each COA is based on a defined and configurable set of comparators that a control station or other HVA need to perform a mission.

6. The method of claim 1, further comprising applying constraints to the visibility window of time, wherein the constraints include one or more of: sun angle, moon angle, and mission-dependent constraints.

7. The method of claim 1, further comprising performing link budget analysis to generate a maximum range constraint, wherein, when the visibility window of time for a potentially-interfering RSO is within the maximum range constraint, there is RFI or EMI for the potentially-interfering RSO.

8. The method of claim 1, wherein the visibility window of time is calculated based on a line-of-sight and a radiation pattern of each of the RSOs.

9. The method of claim 1, wherein the visibility window of time is calculated to correspond to a distance between a respective RSO required to achieve an acceptable signal as received by the HVA.

10. The method of claim 1, wherein the visibility window of time is calculated responsive to a directivity of an HVA radiation pattern or a power level of the radiation pattern.

11. The method of claim 1, wherein the visibility window of time determines an angle or orbital path of each RSO and represents a period of time that each RSO is separated by less than the predetermined threshold distance from the HVA.

12. The method of claim 1, further comprising:
using an Artificial Intelligence (AI)/Machine Learning (ML) engine to determine that there are sufficient patterns for a potential RFI or EMI event.

13. A satellite capable of predicting and avoiding Radio Frequency (RF) Interference (RFI) or Electromagnetic Interference (EMI) from one or more of a plurality of resident space objects (RSOs), the satellite comprising:
a processing circuit configured to:
obtain orbit data and transmission data for the satellite and the plurality of RSOs;

calculate a visibility window of time for each of the RSOs being separated from the satellite by less than a predetermined threshold distance;

perform comparison of transmission parameters of each of the RSOs and the satellite to determine whether each of the RSOs has a potential RFI or EMI with the satellite;

calculate an orientation of each of the RSOs in a respective visibility window of time to determine a direction of transmission of each of the RSOs with respect to the satellite;

when there is a match in comparison of the transmission parameters and the orientation of a compatible RSO in the visibility window of time is within a predetermined threshold, add the compatible RSO to a compatible RSO list;

generate courses of action (COAs) based on the compatible RSO list;

score each of the COAs;

select a best scored COA for a first course of action for avoidance of RFI or EMI;

schedule the first course of action; and autonomously execute the first course of action by the satellite to avoid RFI or EMI.

14. The satellite of claim 13, wherein the transmission parameters include one or more of; frequency, volume of influence, power, gain, and modulation.

15. The satellite of claim 13, wherein the COAs include one or more of: hand off to a different satellite, creation of an outage window with no transmission, switching frequencies, adjusting power or adjusting modulation, using a different communication window, and shortening a communication window time.

16. The satellite of claim 13, wherein the processing circuit is further configured to apply constraints to the visibility window of time, wherein the constraints include one or more of: sun angle, moon angle, and mission-dependent constraints.

17. The satellite of claim 13, wherein the processing circuit is further configured to perform link budget analysis to generate a maximum range constraint, wherein, when the visibility window of time for a potentially-interfering RSO is within the maximum range constraint, there is RFI or EMI for the potentially-interfering RSO.

18. The satellite of claim 13, wherein the visibility window of time is based on a line-of-sight and a radiation pattern of each of the RSOs.

19. The satellite of claim 13, wherein the visibility window of time corresponds to a distance between a respective RSO required to achieve an acceptable signal as received by the satellite.

20. The satellite of claim 13, wherein the visibility window of time determines an angle or orbital path of each RSO and represents a period of time that each RSO is separated by less than the predetermined threshold distance from the satellite.

* * * * *